Figure 2:
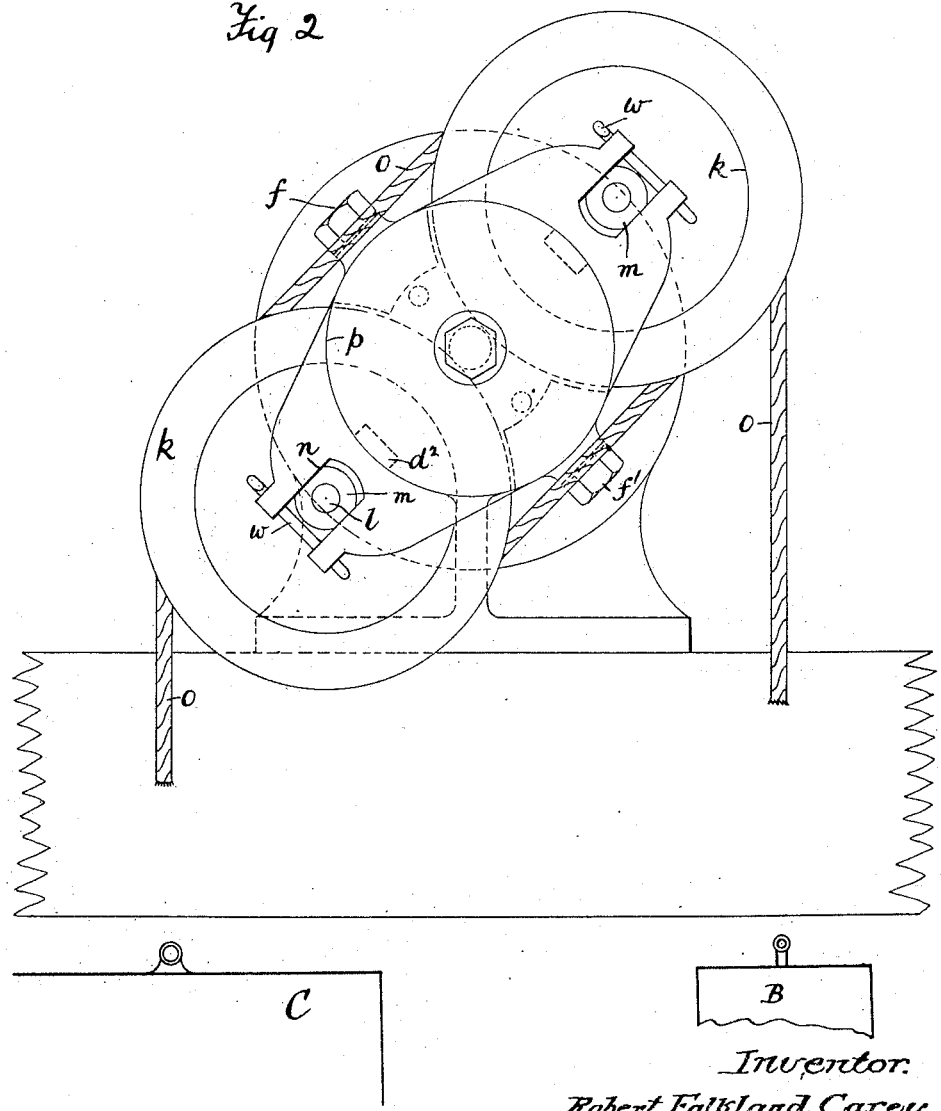

R. F. CAREY.
TRANSMISSION GEAR FOR LIFTS, HOISTS, AND THE LIKE.
APPLICATION FILED JUNE 3, 1915.
1,279,253.
Patented Sept. 17, 1918.
2 SHEETS—SHEET 1.
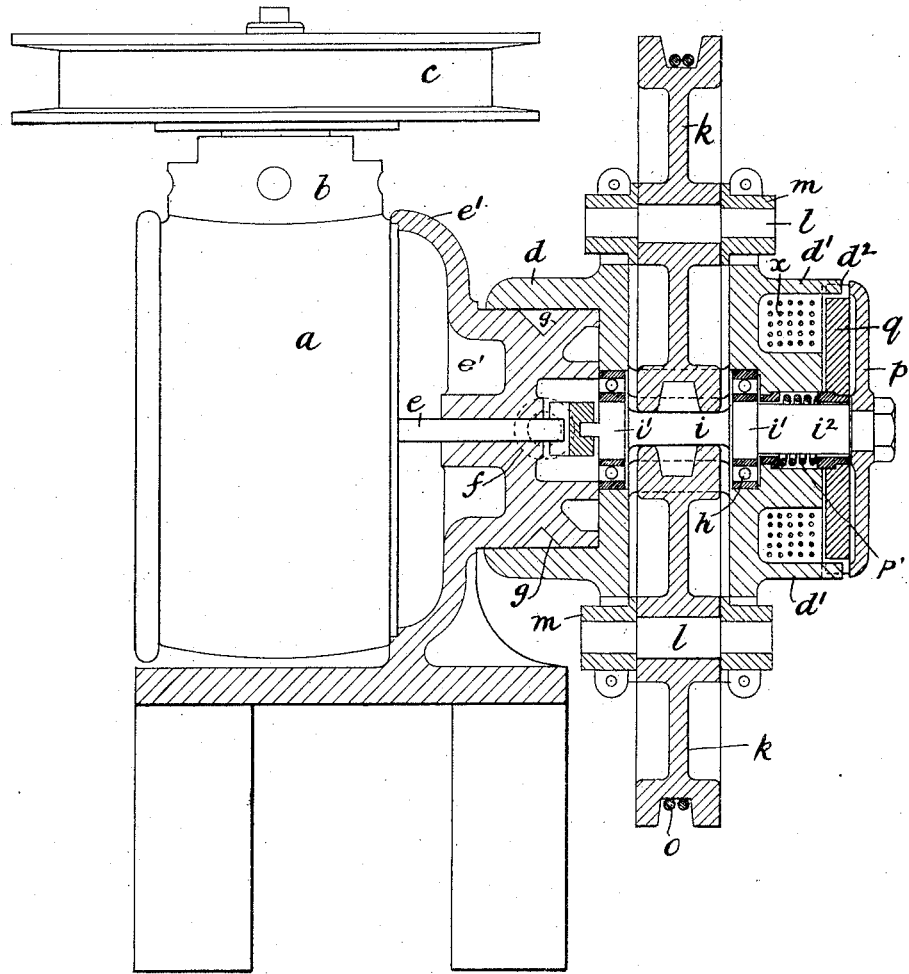
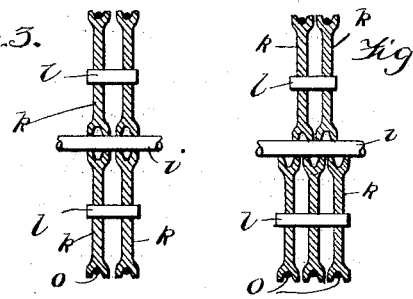
Inventor.
Robert Falkland Carey.
By J. Walter Fowler
atty.

R. F. CAREY.
TRANSMISSION GEAR FOR LIFTS, HOISTS, AND THE LIKE.
APPLICATION FILED JUNE 3, 1915.

1,279,253.

Patented Sept. 17, 1918.
2 SHEETS—SHEET 2.

Inventor.
Robert Falkland Carey.
By T. Walter Fowler
atty.

UNITED STATES PATENT OFFICE.

ROBERT FALKLAND CAREY, OF LEIGH-ON-SEA, ENGLAND.

TRANSMISSION-GEAR FOR LIFTS, HOISTS, AND THE LIKE.

1,279,253.   Specification of Letters Patent.   Patented Sept. 17, 1918.

Application filed June 3, 1915.   Serial No. 31,887.

*To all whom it may concern:*

Be it known that I, ROBERT FALKLAND CAREY, engineer, a subject of the King of England, and residing at Leigh-on-Sea, Essex, England, have invented certain new and useful Improvements in Transmission-Gear for Lifts, Hoists, and the like, of which the following is a specification.

This invention relates to transmission gearing for lifts, hoists and the like. The invention has for object to provide an improved transmission gearing for use with more especially electric or other high-speed motors and adapted to transmit the power to the haulage rope or the like in a particularly direct and efficient manner.

The present invention employs a driving member which is arranged in the form of a roller or equivalent between the peripheries of driven wheels or disks, frictional driving contact thus taking place between the peripheries of the roller and the driven disks.

According to the present invention, the haulage rope or other flexible connection is wound or wrapped around the peripheries of the driven disks one or more times. By this means the driven disks are automatically kept up to their work with any necessary amount of pressure, such pressure being obtained by the tension on the haulage rope due to the load on said rope and to the number of wrappings around the driven disks. The rope may be wrapped as often as desired around the driven wheels to obtain greater pressure at the engaging surfaces and prevent slipping; the pressure so produced upon the driving and driven members are self-contained and balanced, and they therefore place no extra load upon the bearings of the several members, however many extra turns are taken. The driving member is preferably mounted on ball or roller bearings, which constitute practically the only load-carrying bearings in the mechanism.

Other features of the invention are, the arrangement of a frame or bracket made to swing so as to suit centers of various distances apart (*i. e.* centers of the ropes leading to the cage and the balance weight), and carrying the supports for the driving roller, and brake mechanisms which are designed to be applied to the apparatus when the latter is stopped and to be released when the apparatus is started, as hereafter described.

Upon the accompanying sheet of drawings I have shown the present invention applied to the winding mechanism of a lift operated by a high speed electric motor.

Figure 1 is an elevation part section and Fig. 2 is an end view of the improved gearing and showing an electromagnetic brake. Fig. 3 is a diagram showing an arrangement of duplicated disks, and Fig. 4 is another diagram showing an arrangement of disks in which they are not all in the same plane.

The motor $a$ is mounted in any suitable manner, say at the top of the lift-well, and is controlled by a switch $b$, of which the switch drum is shown at $c$, connected to the hand rope or equivalent. At one end of the motor $a$ there is provided a frame $d$ which may be fitted either around the boss $e^1$ of the bearing for the armature shaft $e$. The frame $d$ is preferably adapted to swing around this boss and is clamped in position by means of one or more set-screws $f\ f^1$ entering a circumferential groove $g$ in the boss. By means of this arrangement the centers of the ropes may within limits be adjusted to suit various sizes of lift cages.

The center portion of the frame $d$ carries a pair of ball bearings $h\ h$ in which is mounted the driving roller $i$ consisting of a small cylinder flanged at each end as at $i'$ to accommodate the inner races of the ball bearings. One end of the roller $i$ is arranged to be connected to the armature shaft $e$, preferably by means of a flexible or universal joint, for example a coupling of the Oldham type.

Obviously the roller $i$ may be formed as an extension of the shaft $e$ but I prefer to interpose a coupling as shown in Fig. 1.

Upon diametrically opposite sides of the cylindrical roller $i$ two driven wheels or disks $k\ k$ are arranged, the spindles $l$ of which are mounted in bearing blocks $m$ sliding in suitable guides $n$ on each side of the frame $d$.

The bearing blocks $m$ may in some cases be dispensed with and the outer ends of the spindle $l$ be flattened to engage the slot or guide $n$.

The rope $o$ which is connected at one end to the cage indicated at C and at the other to the counterweight indicated at B, passes around the grooved rims of the two driven wheels $k\ k$, being wrapped, for example, twice over each wheel so as to increase the pressure exerted by these wheels against the driving roller $i$. The engaging surfaces are preferably hardened to reduce wear, the roller being of hardened steel for example, and the peripheries of the wheels are treated by any suitable process for the same purpose.

Each of the wheels or disks $k$ $k$ may as shown in Fig. 3, be duplicated if desired, the two disks being arranged side by side upon the same spindle $l$, and each disk on the same spindle carries one of the turns of the rope.

The free end of the driving roller $i$ may be provided with an electromagnet or other brake. For example it may carry at its extremity a flanged plate $p$ keyed or otherwise secured thereto. In the drawings, Fig. 1, this plate $p$ is shown bolted to the extension $i^2$. Against this flanged plate there is pressed by means of a spring $p'$ encircling the extended shaft $i^2$ of the driving roller $i$ a slidable disk $q$ which is held against rotation, for example, by engagement of its periphery with horn $d^2$ upon a cylindrical flange $d'$ projecting from the frame $d$ carrying the driven wheels $k$ $k$. Within the space so afforded inside the cylindrical flange $d'$ the winding $x$ of the electrical magnet coil is arranged around a central core so that the slidable disk $q$ forms the armature of a magnetic circuit. The spring $p'$ normally holds the disk $q$ in contact with the flanged plate $p$, and thereby prevents movement of the latter as well as of the driving roller $i$. The action of the magnet coil withdraws the slidable disk $q$ and releases the brake. This disk $q$ is thus capable of moving inward or outward to a limited extent along the shaft extension $i^2$.

The bearing brasses $p^2$ are shouldered as shown in Fig. 1, to engage a corresponding shoulder in the bore of the disk $q$ and the cylindrical portion $d'$; these brasses are introduced to prevent a continuous path for the magnetic field between the cast-iron frame $d$ $d'$ and plate $q$. Similar provision may be made, if necessary, around the horns $d^2$. The plate $q$ moves with the brass $p^2$ being forced outward by the coiled spring $p'$.

In Fig. 2 I have shown at $w$ a split pin which prevents the bearings for the spindles $l$ passing out of their guides $n$ in the event of the rope $o$ being removed.

Instead of arranging two disks $k$ $k$ on opposite sides of the driving roller $i$, I may employ three or more disks spaced around the same; moreover the several disks need not necessarily be in the same plane. Or again and as shown in Fig. 4, a number such as two disks on one side may be balanced by three disks on the other side of the roller $i$ and in this case it is obvious the disks could not be all in the same plane.

It will be observed that practically there is no load on the spindles $l$ of the wheels or disks $k$ but the weight of the load is carried direct on the central spindle $i$ which is mounted on ball bearings. When the centers of the spindles $l$ and the roller $i$ are in line parallel with the ropes, there is no load at all on the spindles $l$ but when the line drawn through these centers is at an angle to the ropes, a portion of the load is taken by the spindles $l$ $l$.

The ropes may be wrapped any desired number of times over the driven wheels.

But small space is required for this gearing mechanism and it lends itself particularly well to standardization.

Having thus described my invention, what I claim as such and desire to secure by Letters Patent, is:—

1. A transmission gear for lifts, hoists and the like, comprising a driving roller and driven wheels, said driving roller being intermediate of said driven wheels, means for rotating said roller, a unitary frame adapted to swing around the axis of said driving roller, said frame being in balance about said axis, said driven wheels having peripheries adapted to bear upon said roller, said roller being fixed in position and rotatably arranged between the peripheries of said driven wheels and said driven wheels being journaled in said balanced, swinging unitary frame and adapted to swing about the axis of said central roller, a flexible haulage member passed around the outer portion of said driven wheels so that the tension in the haulage member is utilized to impart driving friction between the driving surfaces, and a lift-cage and a balance-weight attached to the respective ends of said haulage member.

2. A transmission gear for lifts, hoists and the like comprising a driving roller and driven wheels, said roller being intermediate of said driven wheels, means for rotating said roller, a unitary frame adapted to swing about the axis of said roller, said frame being in balance about said axis, the driven wheels being provided with peripheries adapted to bear on said roller, said roller being fixed in position and rotatably arranged between the peripheries of said driven wheels and said driven wheels being journaled in said balanced swinging frame so as to be capable of swinging with the latter about said central roller, a flexible haulage member passed around the outer portion of said driven wheels so that the tension in the haulage member is utilized to impart driving friction between said roller and said wheel peripheries, the work being accordingly divided between the driven members, a lift-cage and a balance weight attached to the respective ends of said haulage member.

3. A transmission gear for lifts, hoists and the like, comprising a driving roller, driven wheels having peripheries adapted to bear on said driving roller, said roller being arranged intermediately of said driven wheels, means for rotating said central driving roller, a unitary frame adapted to swing around the axis of said driving roller, said frame being in balance about said axis and said driven wheels being journaled in said balanced frame so as to swing about said central roller, said balanced and swinging unitary frame having slots on opposite sides of the central roller, said slots containing bearing-blocks wherein the spindles of said driven wheels are journaled, said driven wheels thereby adapted to swing with said frame centrally about the axis of said driving roller, a flexible haulage member passed around the outer portion of said driven wheels so that the tension in the haulage member is utilized to impart driving friction between said roller and said wheel peripheries, the work being divided between the driven members, and a lift-cage and a balance-weight attached to the respective ends of said haulage member.

4. A transmission gear for lifts, hoists and the like, comprising a driving roller, means for rotating said roller, said means comprising a motor, a bearing boss on the frame of said motor and a driving shaft from the motor extending through said boss, a frame extending to opposite sides of said driving roller and turnably engaging the said bearing boss so as to be supported by said boss and to swing around said driving shaft, a driving connection in alinement between said shaft and said driving roller, driven wheels having peripheries adapted to bear upon said roller with said roller arranged between the peripheries of said driven wheels, a flexible haulage member passed around the outer portion of said driven wheels so that the tension in the haulage member is utilized to impart driving friction between said roller and said wheel peripheries, the work being divided between the driven members, and a lift-cage and a balance-weight attached to the respective ends of said haulage member.

5. A transmission gear for lifts, hoists and the like, comprising a driving roller, driven wheels having peripheries adapted to bear on said driving roller, said roller being arranged intermediately of said driven wheels, means for rotating said central driving roller, said means comprising an electric motor, a unitary frame extending on opposite sides of said roller and mounted on said motor so as to swing about the axis of said rolled, said frame being in balance about said axis, slots in said swinging, balanced frame, spindles guided in said slots, a driven wheel mounted on each said spindle, said wheel peripheries adapted to be in frictional contact with the periphery of said central driving roller, a flexible haulage member passed around the outer portion of said driven wheels, and a lift-cage and a balance-weight secured respectively to the ends of said flexible haulage member, so that the tension in said haulage member is utilized to hold the driven wheels which are mounted in the slots in said frame, in driving engagement with said central roller.

6. A transmission gear for lifts, hoists and the like, comprising a driving roller, means for rotating said roller, said means comprising an electric motor, flanges upon the ends of said roller, a frame extending on opposite sides of said roller and mounted on said motor so as to swing about said roller, slots in said frame, spindles guided in said slots, means for preventing said spindle from passing out of said slots, a driven wheel mounted on each said spindle, said wheel peripheries adapted to be in frictional contact with the periphery of said driving roller, ball bearings interposed between said flanges on the driving roller and the frame, a flexible haulage member passed around the outer portion of the driven wheels, and a lift-cage and a balance-weight secured respectively to the ends of said flexible haulage member, so that the tension in said haulage member is utilized to hold the driven wheels which are mounted in the slots in said frame, in driving engagement with said central roller.

7. A transmission gear for lifts, hoists and the like, comprising a driving roller, means for rotating said roller, said means comprising an electric motor, a frame extending on opposite sides of said roller and mounted on said motor so as to swing about said roller, slots in said frame, spindles guided in said slots, means for preventing said spindles from passing out of said slots, a driven wheel mounted on each said spindle, said wheel peripheries adapted to be in frictional contact with the periphery of said driving roller, a prolongation of the central driving roller on the end remote from the motor, and a brake device mounted upon said prolongation, means for applying and releasing said brake, a flexible haulage member passed around the outer portion of said driven wheels, and a lift-cage and a balance-weight secured respectively to the ends of said flexible haulage member, so that the tension in said haulage member is utilized to hold the driven wheels mounted in the slots in said frame, at all times in driving engagement with said central roller.

8. A transmission gear for lifts, hoists and the like, comprising a driving roller, means for rotating said roller, said means comprising an electric motor having a casing, a frame extending on opposite sides of said roller and mounted on the casing of said motor so as to swing about said roller, slots in said frame, spindles guided in said slots, a driven wheel mounted on each said spindle, said wheel peripheries adapted to be in frictional contact with the periphery of said driving roller, a prolongation of said driving roller, a flanged plate secured upon the extremity of said prolongation, a slidable disk upon said prolongation, said disk capable of being pressed against said plate and held against rotation, means for holding said disk and plate in frictional contact and means for separating said disk and plate, a flexible haulage member passed around the outer portion of said driven wheels, and a lift-cage and a balance-weight secured respectively to the ends of said flexible haulage member, so that the tension in said haulage member is utilized to hold the driven wheels mounted in the slots in said frame, in driving engagement with said central roller.

In testimony whereof I have affixed my signature in presence of two witnesses.

ROBERT FALKLAND CAREY.

Witnesses:
 VICTOR FALLON FEENY,
 VICTOR ISIDORE FEENY.

Copies of this patent may be obtained for five cents each, by addressing the "Commissioner of Patents, Washington, D. C."